(12) United States Patent
Geilenkirchen

(10) Patent No.: US 7,687,565 B2
(45) Date of Patent: Mar. 30, 2010

(54) RUBBER MATERIAL AND METHOD FOR PRODUCTION THEREOF

(75) Inventor: Robert Geilenkirchen, Fleron (BE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 10/581,626

(22) PCT Filed: Nov. 17, 2004

(86) PCT No.: PCT/DE2004/002525

§ 371 (c)(1), (2), (4) Date: Apr. 6, 2007

(87) PCT Pub. No.: WO2005/056356

PCT Pub. Date: Jun. 23, 2005

(65) Prior Publication Data

US 2007/0294852 A1 Dec. 27, 2007

(30) Foreign Application Priority Data

Dec. 5, 2003 (DE) ................................ 103 56 934

(51) Int. Cl.
*B60C 1/00* (2006.01)
*A47L 1/00* (2006.01)

(52) U.S. Cl. .................. 524/495; 15/250.361

(58) Field of Classification Search .................. 524/495
See application file for complete search history.

(56) References Cited

U.S. PATENT DOCUMENTS

| 2,999,831 | A | 9/1961 | Stewart |
|---|---|---|---|
| 4,075,373 | A | 2/1978 | Monsod, Jr. |
| 4,374,218 | A | 2/1983 | Tay |
| 4,716,618 | A | 1/1988 | Yasukawa et al. |
| 5,456,750 | A | 10/1995 | Mackay et al. |
| 6,195,833 | B1 * | 3/2001 | Geilenkirchen et al. .. 15/250.48 |
| 2002/0099142 | A1 * | 7/2002 | Faulkner ..................... 525/199 |
| 2004/0010069 | A1 * | 1/2004 | Hong et al. ................. 524/495 |

FOREIGN PATENT DOCUMENTS

| DE | 196 15 421 | 10/1997 |
|---|---|---|
| JP | 63-251442 | 10/1988 |
| JP | 09-071699 | 3/1997 |
| JP | 09071699 A * | 3/1997 |
| JP | 10024803 | 1/1998 |
| WO | 03/050182 A1 | 6/2003 |

OTHER PUBLICATIONS

Translation of JP 09-071699, Mar. 1997.*

* cited by examiner

*Primary Examiner*—Ling-Siu Choi
*Assistant Examiner*—Hui Chin
(74) *Attorney, Agent, or Firm*—Michael Best & Friedrich LLP

(57) ABSTRACT

A rubber material, in particular for wiper blades of windshield wipers or for automotive tires, is described, containing at least one grade of rubber, at least one filler and processing adjuvants. Of at least one of the grades of rubber present, the rubber material contains a first and a second fraction which differ in viscosity in the unvulcanized state.

21 Claims, 1 Drawing Sheet

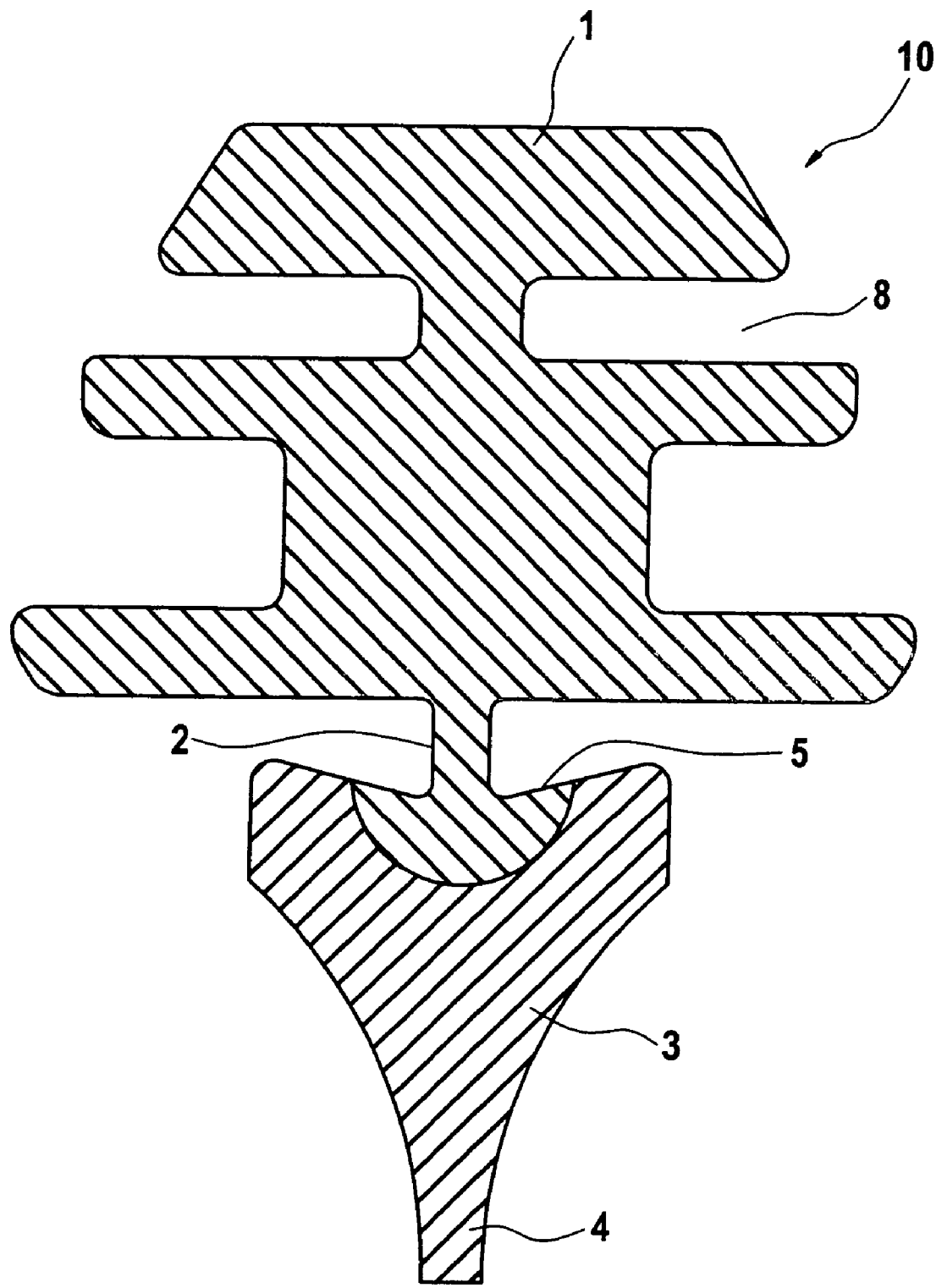

RUBBER MATERIAL AND METHOD FOR PRODUCTION THEREOF

BACKGROUND OF THE INVENTION

The invention relates to a rubber material, in particular for wiper blades on windshield wipers or for automotive tires as well as use thereof according to the preamble of the independent claims.

It is important for windshield wiper blades to be able to adapt as well as possible to the contour of the windshield of a motor vehicle and to remain flexible even at different temperatures. Wiper blades are usually made of elastomer profiles, using mainly rubber materials such as natural rubber or synthetic grades of rubber such as chloroprene rubber or EPDM. In addition, wiper blades made of silicone rubber or polyurethane rubber are also known.

Such a wiper blade is described in DE 196 15 421 A1, for example. This wiper blade is comprised of a base part which allows the wiper blade to be held in a metal frame, and a wiper lip which is connected by a web to the base part and has a lip area on its end facing the glass surface to be wiped. The base part and the web are made of a rubber matrix consisting at least primarily of polychloroprene, whereas the wiper lip has a different material composition. In addition, the wiper blade contains zinc oxide and carbon black as fillers which influence the mechanical properties of the wiper blade and its processability. The wiper blade is preferably produced by a co-extrusion method.

SUMMARY OF THE INVENTION

The object of the present invention is to provide a rubber material and a method for producing same which allows the production of profiles having dimensional stability and mechanical load capacity.

The inventive rubber material has the advantage over the related art that a rubber material suitable for manufacturing wiper blades and/or automotive tires and having a very favorable profile of properties is available and can be manufactured very reproducibly and therefore inexpensively. This is accomplished by the fact that the rubber material contains as filler a mixture of at least two grades of carbon black because the mixture of two grades of carbon black allows a higher degree of filling of the rubber material than the use of a single grade of carbon black without any negative effect on the mechanical properties of the rubber material in the end state, e.g., with regard to its hardness.

Preferably the quantities of the two grades of carbon black are selected so that the highest possible degree of filling which is favorable for processing rubber material is achieved while, on the other hand, the total hardness of the fully cured rubber material is not too high because otherwise the system would become brittle and would no longer be wipable, for example.

It is advantageous if the rubber material contains as the filler in particular a mixture of furnace black and thermal black because these differ greatly with regard to their grain size and the mechanical properties resulting for the rubber material and thus allow an optimum adjustment of the mechanical properties of the rubber material based on the mixing ratio of the two grades of carbon black.

It is also advantageous if at least one of the grades of rubber contained in the rubber material has two fractions which differ in their viscosity in the unvulcanized state. The quantity ratios of the two fractions are selected so that the total viscosity of the crude rubber material is favorable for processing the rubber material. The total viscosity of the crude rubber material has a significant influence, e.g., on the swelling behavior of the material in extrusion and is thus a prerequisite for adequate dimensional stability of the rubber profiles thus produced.

In addition, it is advantageous if the rubber material contains a homogenizing agent, e.g., in the form of an organic resin so that the rubber material forms a stable dispersion of the two rubber fractions as well as the additional substances contained in the rubber material.

In a particularly preferred embodiment, the rubber material does not contain any calcium oxide or calcium hydroxide. Calcium oxide is usually added to rubber materials during processing, in particular as a desiccant, but it has a negative effect on the mechanical properties of the resulting rubber material.

BRIEF DESCRIPTION OF THE DRAWING

An exemplary embodiment of the present invention is depicted in the drawing and explained in greater detail in the following description.

FIG. 1 shows a cross section through an inventive wiper blade having an exterior spring rail.

DETAILED DESCRIPTION

FIG. 1 shows a wiper blade 10 according to a first exemplary embodiment of a present invention. The wiper blade is designed essentially in the shape of a strip. It is comprised of a widened head part 1 which is connected to a wedge 3 by a fold-over web 2. The head part 1 has recesses 8 to receive an exterior spring rail (not shown). The wedge 3 tapers to a wiper lip 4 on its end opposite the head part 1, facing the glass surface that is to be cleaned.

The head part 1 and/or the fold-over web 2 is preferably made of EPDM (ethylene-propylene-diene terpolymer), EPR (ethylene-propylene copolymer), CR (chloroprene), NR (natural rubber), BR (polybutadiene), SBR (styrene-butadiene rubber) or IR (polyisoprene) and/or blends thereof. The wedge 3 is preferably also made of the aforementioned materials but it differs with regard to its composition from that of head part 1. For better anchoring of the fold-over web 2 in the wedge 3, an area 5 of the wedge 3 adjacent to the fold-over web 2 is made of the material of the fold-over web 2.

The rubber material contains two fractions of at least one of the aforementioned grades of rubber EPDM, SBR, DPR, CR, BR, NR or IR which, although assigned to the same grades of rubber, differ in their viscosity in the unvulcanized state. For example, the rubber material may already contain a fraction EPDM 1, for example, having a first Mooney viscosity (at 125° C.) of 20 to 95 Mooney, for example, preferably 20 to 50 Mooney, and a fraction EPDM 2 having a second Mooney viscosity of 20 to 95 Mooney, for example, preferably 50 to 95 Mooney. The quantity ratios of the two fractions EPDM 1 and EPDM 2 are selected so that the total viscosity of the crude rubber material is in a range of preferably 30 to 60 Mooney and thus optimum processing of the crude rubber material is ensured.

The difference of the fractions EPDM 1 and EPDM 2 may be due, for example, to appropriate additives contained in the fractions or to appropriate choice of the quantity ratios of the monomers ethylene, propylene and/or diene on which the EPDM terpolymer is based. Another possibility of controlling the viscosity consists of varying the diene on which EPDM is based.

In addition, an increase in the amount of ethylene component in the EPDM leads to an improvement in its extrudability, whereas an increase in the propylene content leads to an improvement in the elasticity of the resulting EPDM. The same thing is also true of the properties of EPR as a function of its ethylene and/or propylene content.

The rubber material may include several grades of rubber. Two or more fractions of one grade of rubber may be used, but it is also possible to use two or more fractions of at least two grades of rubber contained in the rubber material. Then a fraction is always understood to refer to a substance portion that is structurally related or identical to the grade of rubber on which the substance is based.

In a preferred embodiment, the head part 1 is made of EPDM, CR or a blend thereof, while the wedge 3 and/or the wiper lip 4 are made of BR. The wedge 3 and/or wiper lip 4 is preferably made of a blend of at least two different BR fractions which differ with regard to their side chains and/or their cis-trans sequence.

The rubber material also contains a homogenizing agent which ensures better blendability of the different grades of rubber or fractions of rubber in the crude rubber. At the same time it leads to stabilization of the entire crude rubber material as a dispersion of fillers and adjuvants in the crude rubber batch. For example, aromatic or aliphatic resins are used as the homogenizing agent.

The rubber material also contains at least one filler. The filler is preferably made of carbon black. For example so-called furnace black may be used as the carbon black. However, it has proven advantageous to use a mixture of furnace black and thermal black as the filler. Furnace black generally has a relatively fine grain size and leads to a relatively hard but abrasion-resistant rubber material at high degrees of filling, but thermal black has a coarse grain which leads only to a slight increase in the hardness of the rubber material even at high degrees of filling.

The quantity amounts of the two grades of rubber are preferably selected so that the highest possible degree of filling which is favorable for processing the rubber material is achieved while on the other hand the total hardness of the fully cured rubber material is not too high because otherwise the system would become brittle and would no longer be wipable, for example.

A particularly high degree of filling can be achieved if a plasticizer is additionally added to the rubber material because this effectively counteracts the embrittlement tendency of the rubber material, which increases with an increase in filler content. Suitable plasticizers include, for example, synthetic plasticizers and mineral oil.

Desiccants are usually added to the crude rubber batch in the production of rubber materials. If such desiccants are omitted, the moisture content in the starting materials will yield a porous surface of the rubber profile produced during extrusion or vulcanization. Calcium oxide is an example of a desiccant conventionally used with rubber materials. It forms calcium hydroxide when it comes in contact with the moisture contained in the rubber material. However, problems can occur when using calcium oxide if the resulting calcium hydroxide forms crystals.

For this reason, the present rubber material is preferably produced without the addition of calcium oxide. To nevertheless achieve an adequate surface of the profile thus produced, the moisture content of the starting materials needed to produce the rubber material is tested first and, if necessary, the starting materials are stored separately in the absence of moisture. In addition, the crude rubber material is vulcanized with the shortest possible reaction time. A vulcanization system based on peroxides in particular is suitable for this purpose.

An exemplary embodiment of a rubber material and/or its composition is given below, based on 100 parts by weight elastomer (phr).

| Substance | Content in phr Recipe 1 | Content in phr Recipe 2 |
|---|---|---|
| EPDM 1 | 0.5-100 | — |
| EPDM 2 | 0.5-100 | — |
| EPR 1 | — | 0.5-100 |
| EPR 2 | — | 0.5-100 |
| NR, IR, BR, SBR or CR | 0-10 | 0-70 |
| Homogenization agent | 0-10 | 0-10 |
| Furnace black | 20-120 | 20-120 |
| Thermal black | 20-120 | 20-120 |
| Peroxide | 0-10 | 0.5-10 |
| Sulfur | 0-1 | — |
| Adjuvant + plasticizer | 20-105 | 20-105 |

The rubber material is produced by first supplying one or more grades of rubber and/or one or more fractions of the respective grades of rubber containing filler(s), homogenizing agent and other processing aids to an extruder where the ingredients are mixed thoroughly. Alternatively, the starting materials may also be sent for mixing, blended in a mixer and compression molded, for example, or sent to an injection molding process. This yields a profiled strand, which is in the form of a double strand when producing rubber wipers for windshield wipers; with the double strand, two single strands of the rubber wiper are joined together in the longitudinal direction of the double strand in the area of the wiper lip. The double strand thus produced is sent to a salt bath or an oven for vulcanization, for example, and is vulcanized there at a temperature of approx. 220° C. In another step, if necessary, a surface modification is performed, e.g., by graphitization, halogenation, lacquering or coating. Then the vulcanized elastomer profile is cut in the longitudinal and/or transverse directions.

Alternatively it is possible to modify only certain surface sections of a wiper blade in a targeted manner. Thus, through suitable process management with targeted covering of areas of the wiper blade that are not to be modified, it is possible to modify only the wiper lip that is in contact with the surface to be cleaned or additionally and/or alternatively a guide groove of the wiper blade with which the wiper blade can be inserted into a corresponding wiper blade holder.

The invention claimed is:

1. A rubber material which contains at least one grade of rubber, at least one filler and processing aids, the filler comprising a mixture of at least two different grades of carbon black, and at least one of the grades of rubber having a first fraction and a second fraction, which in the unvulcanized state differ with respect to their viscosity, wherein the overall viscosity of the unvulcanized rubber material is in a range of 30 to 60 Mooney.

2. Rubber material according to claim 1, wherein the filler comprises a mixture of furnace carbon black and thermal carbon black.

3. Rubber material according to claim 1, wherein the rubber material contains 40-320 parts by weight of the filler with respect to 100 parts by weight of elastomer.

4. Rubber material according to claim 1, wherein a plasticizer and/or mineral oil is contained.

5. Rubber material according to claim 1, wherein the grade of rubber is EPDM, EPR, BR, SBR, IR or CR.

6. Rubber material according to claim 1, wherein the rubber material is essentially free from calcium oxide.

7. Rubber material according to claim 1, wherein the rubber material is essentially free from zinc oxide.

8. Rubber material according to claim 2, wherein the rubber material contains 40-320 parts by weight of the filler with respect to 100 parts by weight of elastomer.

9. Rubber material according to claim 8, wherein a plasticizer and/or mineral oil is contained.

10. Rubber material according to claim 9, wherein the grade of rubber is EPDM, EPR, BR, SBR, IR or CR.

11. Rubber material according to claim 10, wherein the rubber material is essentially free from calcium oxide.

12. Rubber material according to claim 11, wherein the rubber material is essentially free from zinc oxide.

13. Rubber material according to claim 12, wherein the rubber material is for wiper blades of windscreen wipers or for motor vehicle tires.

14. A wiper blade for windscreen wipers, characterized by a rubber material which contains at least one grade of rubber, at least one filler and processing aids, the filler comprising a mixture of at least two different grades of carbon black, and at least one of the grades of rubber having a first fraction and a second fraction, which in the unvulcanized state differ with respect to their viscosity, wherein the overall viscosity of the unvulcanized rubber material is in a range of 30 to 60 Mooney.

15. Wiper blade according to claim 14, wherein a head part (1) and/or a web (2) of the wiper blade is made of EPDM and/or CR, and in that a wiper lip (4) of the wiper blade is made of BR.

16. Wiper blade according to claim 14, wherein the filler comprises a mixture of furnace carbon black and thermal carbon black.

17. Wiper blade according to claim 14, wherein the rubber material contains 40-320 parts by weight of the filler with respect to 100 parts by weight of elastomer.

18. Wiper blade according to claim 14, wherein a plasticizer and/or mineral oil is contained.

19. Wiper blade according to claim 14, wherein the grade of rubber is EPDM, EPR, BR, SBR, IR or CR.

20. Wiper blade according to claim 14, wherein the rubber material is essentially free from calcium oxide.

21. Wiper blade according to claim 14, wherein the rubber material is essentially free from zinc oxide.

* * * * *